May 28, 1946.   C. D. MILLER   2,400,887
HIGH-SPEED MOTION-PICTURE CAMERA
Filed Dec. 28, 1940   3 Sheets-Sheet 1
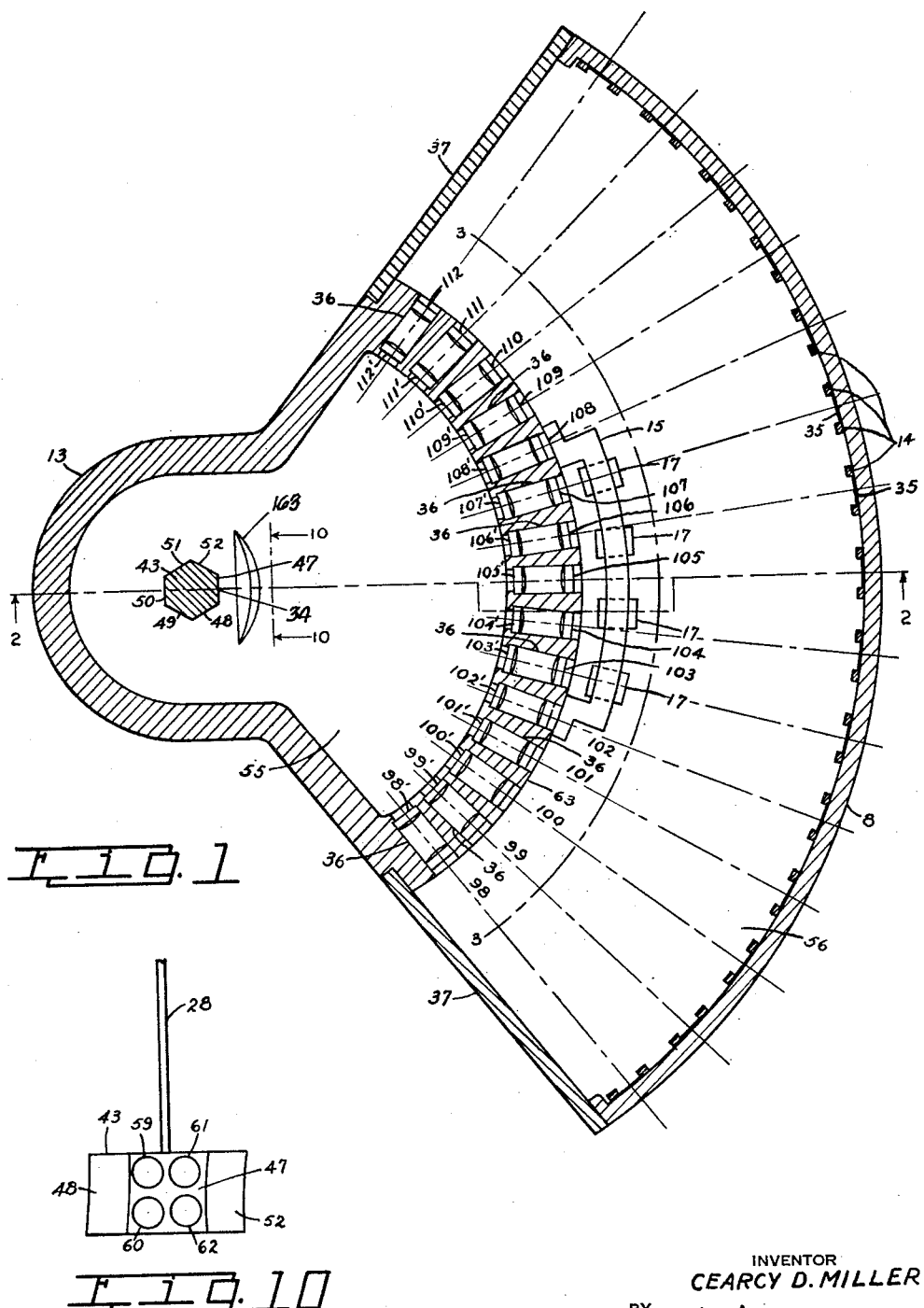
INVENTOR
CEARCY D. MILLER
BY
ATTORNEY

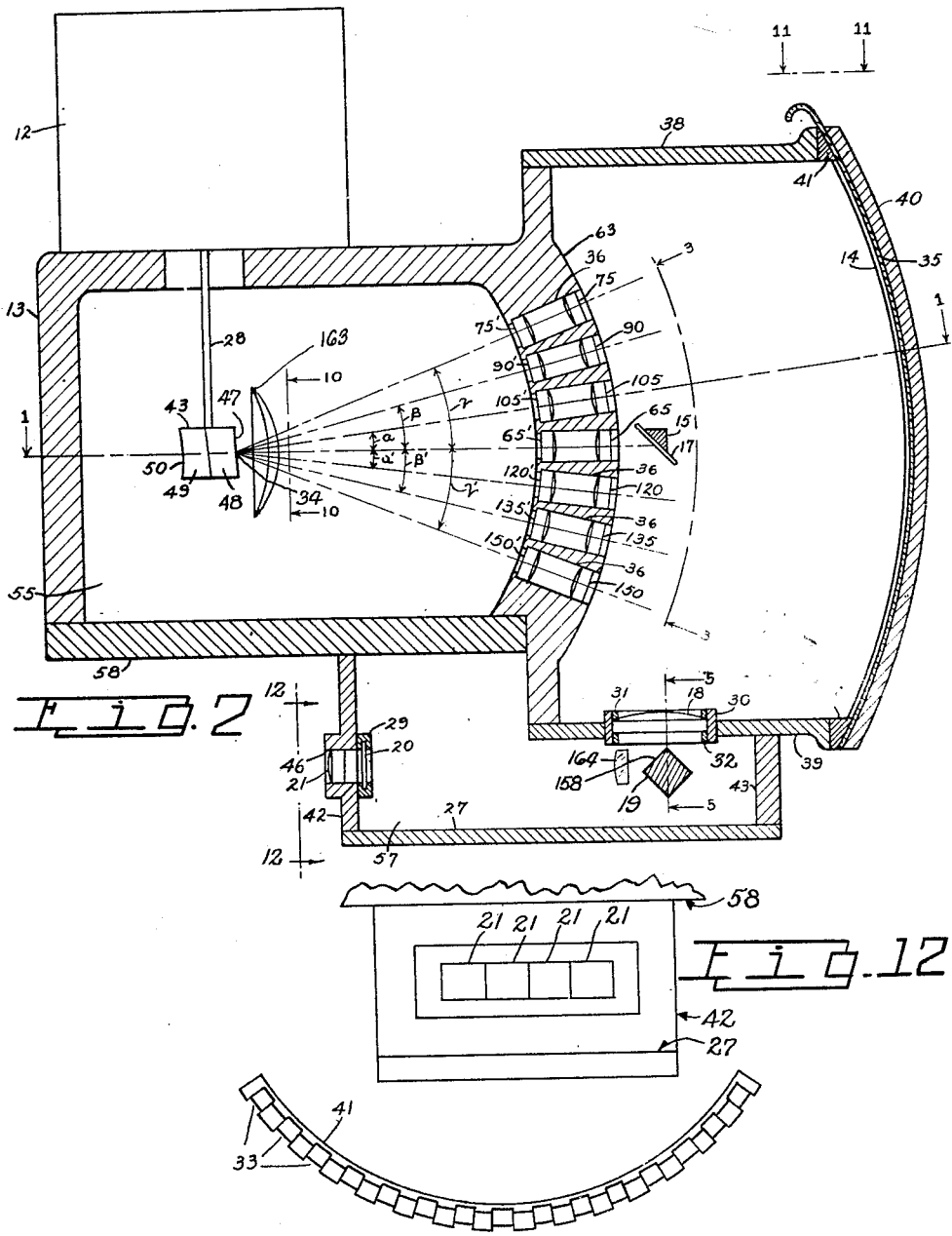

May 28, 1946.  C. D. MILLER  2,400,887
HIGH-SPEED MOTION-PICTURE CAMERA
Filed Dec. 28, 1940  3 Sheets-Sheet 3
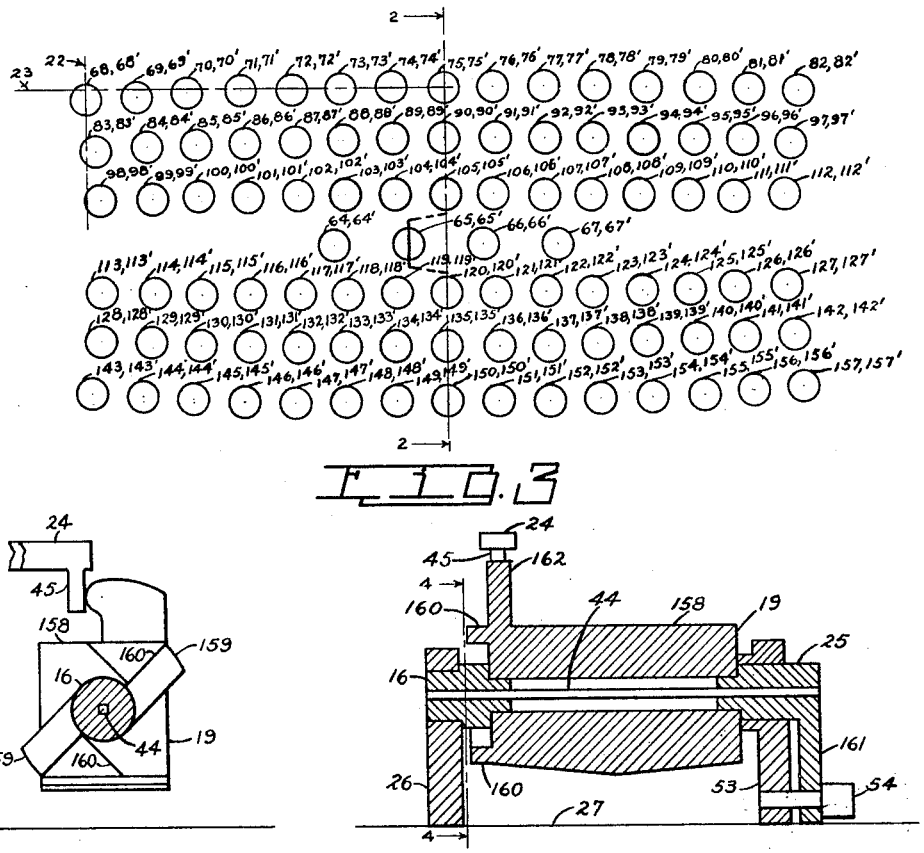
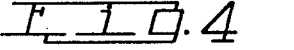 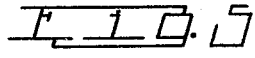
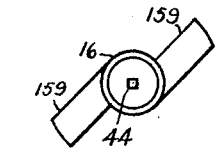 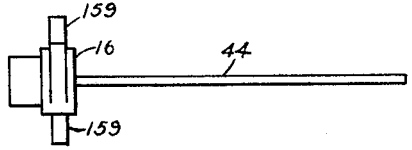
FIG. 4  FIG. 5
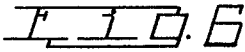 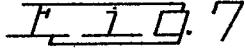
FIG. 6  FIG. 7
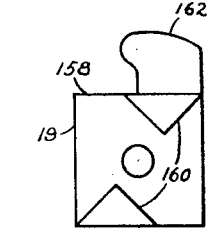 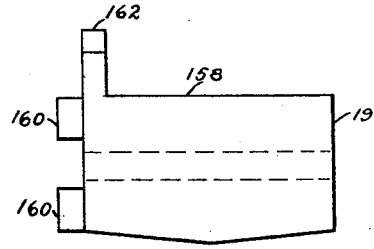
FIG. 8  FIG. 9
INVENTOR
CEARCY D. MILLER
BY
ATTORNEY Patented May 28, 1946

2,400,887

UNITED STATES PATENT OFFICE 2,400,887

HIGH-SPEED MOTION-PICTURE CAMERA

Cearcy D. Miller, Hampton, Va.

Application December 28, 1940, Serial No. 372,081

30 Claims. (Cl. 88—16)

(Granted under the act of March 3, 1883, as amended April 30, 1928; 370 O. G. 757)

This invention relates to a device which is capable of taking photographs at very high rates. Photographs at rates up to 1,000,000 per second are anticipated. The device can be used for taking direct pictures or schlieren pictures of self-luminous phenomena and direct pictures of opaque objects by reflective illumination, and is particularly valuable for the taking of high-speed shadowgraphs or schlieren photographs of non-luminous phenomena in gases.

This device can be designed with a higher mechanical speed limit than any other type of camera known that is capable of taking a comparable number of pictures. The optical speed of this device, when used with shadow or schlieren photography, is sufficient to take pictures at rates up to 1,000,000 per second or higher.

It does not appear possible, in the present state of knowledge, to design a device capable of moving photographic film at a sufficient speed to expose pictures of a useable size at the rate of 1,000,000 per second. For this reason, most known cameras or photographic arrangements taking pictures at speeds comparable with the speed of this device are compelled to use a stationary film. This makes it necessary to form a series of images displaced from each other in time and in position on the film, each such image either remaining stationary on the film or being of such extremely short duration that there is no appreciable motion of image with respect to the film during the time of exposure.

There are systems of photography based on the use of electric spark discharges as a source of illumination which make use of each of the methods mentioned. In each case, however, these systems of photography have the objection that they can not photograph any self-luminous phenomenon by its own light. In the case of a moving image on a stationary film, it is difficult to obtain spark discharges of sufficient intensity and frequency and still of sufficiently short duration to avoid blurring of the image recorded on the film when taking pictures at rates of the order of 1,000,000 per second. Other systems, using spark discharges with stationary images on a stationary film, have the disadvantage of being able to take only comparatively few pictures in one sequence and of requiring that these pictures all be taken on different optical axes.

Many cameras have been invented, operating on the so-called optical compensator principle, which utilize a steady continuous light source and which can be used to photograph self-luminous phenomena. Cameras of this type form a series of images, displaced from each other in time and in position on the film and having no motion relative to the film. This device is one of this type. This device is capable of operation at higher speeds than any other device of the optical compensator type known.

In order to form a series of images, stationary relative to the photosensitive film and displaced from each other in time and in position on the film, the present device makes use of a multiplicity of stationary lenses. Light is projected through these lenses successively by means of rotating concave mirrors. The light beam incident on said rotating concave mirrors is projected on said mirrors by one or more objective lenses in such manner that a real image of the object to be photographed is formed on said mirrors. The aforesaid multiplicity of stationary lenses is so arranged that each lens, or lens pair, will form a stationary secondary real image on the photosensitive film by means of the light which reaches it from the aforesaid rotating concave mirrors. The aforesaid rotating concave mirrors form the multiple surfaces of a single rotating part and are arranged so that each individually reflects light through a different group of the aforesaid multiplicity of stationary lenses.

With the foregoing and other objects in view, the invention consists in the construction, combination, and arrangement of parts hereinafter described and illustrated in the drawings, in which:

Fig. 1 is an approximately horizontal section through the camera on line 1—1 of Fig. 2;

Fig. 2 is a sectional view of the camera on line 2—2 of Figs. 1 and 3;

Fig. 3 is a chart of lens positions as projected on the spherical surface 3—3 indicated in Figs. 1 and 2;

Fig. 4 is a side view of a portion of the shutter mechanism for the camera, being on the line 4—4 of Fig. 5;

Fig. 5 is a longitudinal section of the assembled shutter mechanism, being on the line 5—5 of Fig. 2;

Figs. 6, 7, 8 and 9 are detail views of certain parts of the shutter mechanism shown in Figs. 4 and 5, as projected upon the planes 6—6, 7—7, 8—8, and 9—9, respectively, of Figs. 4 and 5.

Fig. 10 is a view of rotor 43 and shaft 28, taken on the line 10—10 of Figs. 1 and 2.

Fig. 11 is a detail view of strip 41, being on the line 11—11 of Fig. 2.

Fig. 12 is a front view on line 12—12 of Fig. 2 showing a cluster of four objective lenses 21.

Referring particularly to Figs. 1 and 2 of the drawings, the numeral 13 indicates the main frame of the camera. The numerals 37 indicate side plates rigidly attached to the main frame 13. The numeral 38 indicates a top plate and the numeral 39 a bottom plate, both attached rigidly to main frame 13 and to side plates 37. The numeral 58 indicates an additional bottom plate which, together with main frame 13, completely encloses the chamber 55, which is evacuated when the apparatus is in operation. The numeral 40 indicates a shell, in the shape of a portion of a hollow sphere, rigidly attached to side plates 37. Shell 40 is also attached to top plate 38 and bottom plate 39, through strips 41. Frame 13, top plate 38, bottom plate 39, side plates 37, strips 41, and shell 40 completely enclose chamber 56, except that grooves 33 in strips 41, see Fig. 11, serve as openings through which photosensitive film strips 35 may be inserted or withdrawn. Chamber 56 is maintained at atmospheric pressure. An additional chamber 57, also maintained at atmospheric pressure, is enclosed by front plate 42, back plate 43, bottom plate 27, two side plates 26 and 53, see Fig. 5, and by portions of frame 13 and bottom plates 39 and 58.

Within evacuated chamber 55, on shaft 28, is carried rotor 43. Shaft 28 and rotor 43 are supported and driven by air turbine 12, or by any other suitable means, turbine 12 or other supporting and driving device being so constructed and attached to frame 13 in such a manner as to allow the maintenance of a vacuum within the chamber 55 while the apparatus is in operation. In addition to its upper and lower surfaces, the rotor 43, in the present embodiment of this invention, has six side faces 47, 48, 49, 50, 51, and 52. Meniscus lens 163, Figs. 1 and 2, is optional. If this lens is not included in the device, then each of the six side faces 47 to 52, inclusive, of the rotor 43 is a concave spherical reflecting surface. If the meniscus lens 163 is included, then the six side faces 47 to 52, inclusive, of the rotor 43 may be plane flat reflecting surfaces, concave spherical surfaces, or convex spherical reflecting surfaces, depending on the power of the meniscus lens 163. Hereinafter, the optical axis of any concave spherical reflecting surface 47 to 52 of rotor 43 will be defined as the line passing through the center of curvature of that reflecting surface, through the intersection of the surface with the plane of Fig. 1, and through the axis of rotation of rotor 43. Reflecting surfaces 47 to 52, inclusive, intersect their respective optical axes at equal distances from the axis of rotation of rotor 43, measured along lines perpendicular to such axis of rotation. The projection upon the plane of Fig. 1 of the optical axes of reflecting surfaces 47 and 48 make an angle of 60° with each other. This is likewise true, in each case, of reflecting surfaces 48 and 49, 49 and 50, 50 and 51, 51 and 52, and 52 and 47. The optical axis of reflecting surface 47 extends out from that surface above the horizontal plane, that is, the plane of the extreme left-hand portion of Fig. 1, and makes an angle with that plane equal to one-half of angle $\gamma$, shown in Fig. 2. The optical axis of reflecting surface 48 extends out from that surface above the horizontal plane and makes an angle with that plane equal to one-half of angle $\alpha$, shown in Fig. 2. The optical axis of reflecting surface 49 extends out from that surface below the horizontal plane and makes an angle with that plane equal to one-half of angle $\beta'$, shown in Fig. 2. The optical axis of reflecting surface 50 extends out from that surface below the horizontal plane and makes an angle with that plane equal to one-half of angle $\gamma'$, shown in Fig. 2. The optical axis of reflecting surface 51 extends out from that surface below the horizontal plane and makes an angle with that plane equal to one-half of angle $\alpha'$, shown in Fig. 2. The optical axis of reflecting surface 52 extends out from that surface above the horizontal plane and makes an angle with that plane equal to one-half of angle $\beta$, shown in Fig. 2.

If the meniscus lens 163 is not used, then the radius of curvature of any spherical reflecting surface 47 to 52, inclusive, is equal to the distance from point 34 of Figs. 1 and 2 to the nearer surface of any one of the lenses 64' to 67', inclusive, or 68' to 157', inclusive, see Figs. 1, 2, and 3, the point 34 being the point at which any one of the reflecting surfaces 47 to 52, inclusive, intersects its optical axis when such surface is in the position occupied by reflecting surface 47 in Figs. 1 and 2. If the meniscus lens 163 is used, then the reflecting faces 47 to 52, inclusive, of rotor 43 should have such curvature as necessary in conjunction with the meniscus lens 163, as determined by well known optical principles, to give to the combination of meniscus lens 163 and any one of the aforesaid reflecting faces a focal length equal to twice the distance from the point 34 to the nearer surface of any one of the lenses 64' to 67', inclusive, or 68' to 157', inclusive.

Evacuated chamber 55 is separated from chamber 56 by a wall 63, which is an integral part of frame 13. This wall 63 is in the shape of a portion of a hollow sphere, the center of which is the point 34 of Figs. 1 and 2. It is emphasized that point 34 is a stationary point and is the point of intersection of a spherical reflecting surface with its optical axis only when such surface is in the position occupied by spherical reflecting surface 47 in Figs. 1 and 2. In the present embodiment of this invention, there are sixty-four holes 36 extending through the wall 63 from chamber 55 to chamber 56, in which are placed lenses 64 to 157, inclusive, and 64' to 157', inclusive, one hundred and eighty-eight in all, in the manner made clear in Figs. 1, 2, and 3. In Fig. 3, it will be noted that each lens position is designated by a certain numeral and by that same numeral primed. In each case, the plain numeral designates a lens near the outer surface of the spherical wall 63, whereas the numeral primed indicates a lens in the same hole 36 but near the inner surface of spherical wall 63. This distinction is made clear for many of the lenses in Figs. 1 and 2. All lenses designated by plain numerals are equidistant from the point 34. Also, all lenses designated by primed numerals are equidistant from point 34.

The holes 36 in the wall 63 are so located as to place the one hundred and eighty-eight lenses, above referred to, in the positions shown in Fig. 3. Each of these holes 36 is drilled with its axis passing through the point 34. In Fig. 3, the line 22 or any other straight vertical line is a line of constant longitude relative to the sphere of which wall 63 is a part. The line 23, or any other straight horizontal line in Fig. 3, is a line of constant latitude relative to the sphere of which wall 63 is a part. It will be noted that the lenses in Fig. 3 are not arranged exactly in lines of constant latitude or in lines of constant longitude, except that the lenses 64 to 67 and the lenses 64' to 67', inclusive, are in a line of constant latitude and that the lenses 75, 90, 105, 120, 135, and 150 and the lenses 75', 90', 105', 120', 135', and 150' are in a line of constant longitude. The rule governing the precise location of lenses in Fig. 3 will be made clear hereinafter.

In the present embodiment of this invention, four pairs of objective lenses are used; namely, 64 and 64', 65 and 65', 66 and 66', and 67 and 67'. These, as indicated in Fig. 3, are all located with their centers and their optical axes in the same horizontal plane with the point 34 of Figs. 1 and 2. In the present embodiment of this invention, the optical axis of lenses 64 and 64' makes an angle of 10.58⁻ degrees with the optical axis of lenses 65 and 65'. This same angle exists between the axis of lenses 65 and 65' and the axis of lenses 66 and 66'; and between the axis of lenses 66 and 66' and the axis of lenses 67 and 67'. This angle of 10.58⁻ degrees will hereinafter be referred to as 1½ pitches.

In accordance with well known optical principles, light passing through a pair of objective lenses, such as 64 and 64' and falling on any one of the spherical reflecting surfaces such as 47 will be reflected and brought to a focus to form an image of the objective lens 64'. The radius of curvature of the spherical reflecting surface being approximately equal to the distance from the objective lens to the said spherical reflecting surface, meniscus lens 163 not being used, the aforesaid image of the objective lens 64' will be located at approximately the same distance from the spherical reflecting surface as is the objective lens 64' itself. Moreover, if two lines be drawn from the point where spherical reflecting surface 47 intersects its own optical axis through the center of lens 64' and through the center of the image of lens 64', respectively, the plane of these two lines will contain the optical axis of reflecting surface 47, and the optical axis of reflecting surface 47 will bisect the angle existing between these two lines. Consequently, when the optical axis of spherical reflecting surface 47 is in the same vertical plane with the optical axis of objective lenses 64 and 64', then the image of objective lens 64' formed by the light reflected from surface 47 will be directly above the lens 64'. Also, at this time, two lines drawn from the point where reflecting surface 47 intersects its own optical axis to the center of lens 64' and to the center of the image of lens 64', respectively, will make an angle with each other equal to the angle γ indicated in Fig. 2. At this time the image of lens 64', formed by light from reflecting surface 47, will be at its highest position. As rotor 43 turns about its axis from this position, in either direction, the image of lens 64', formed by light from the reflecting surface 47, will be moved in longitude along a curved path of not quite constant latitude. If this path were of constant latitude, then it is clear that the axis of the reflected beam forming the image of lens 64' would almost exactly generate the surface of a cone, such cone having its axis parallel to the axis of rotation of rotor 43 and its apex at the point 34 of Figs. 1 and 2. Since the path followed by image of lens 64' is not quite of constant latitude, the optical axis of the reflected beam may be considered as generating an approximate conical surface. Images of objective lenses 65', 66', and 67', formed by the light from spherical reflecting surface 47 will move in a similar manner, except that they will reach their highest points when directly above lenses 65', 66', or 67', respectively.

The paths followed by images of objective lenses 64' to 67', inclusive, formed by spherical reflecting surfaces 48 to 52, inclusive, will be similar to that described above for the spherical reflecting surface 47, except as follows: The paths followed by the images in the cases of spherical reflecting surfaces 49 and 52 will be less curved than in the case of spherical reflecting surface 47 or spherical reflecting surface 50, the curvature being the same in the case of surface 50 as in the case of surface 47; the paths followed by the images in the cases of spherical reflecting surfaces 48 and 51 will be less curved than in any of the other cases; the paths followed by the images in the cases of spherical reflecting surfaces 49, 50, and 51 will be curved in the reverse manner to those in the other cases; in the cases of spherical reflecting surfaces 49, 50, and 51, the images will be at their lowest points when the optical axes of the respective spherical reflecting surfaces are in the same vertical planes with the respective objective lenses; and to apply the foregoing discussion of the case of spherical reflecting surface 47 to the cases of spherical reflecting surfaces 48, 49, 50, 51, and 52, the angles $\alpha, \beta', \gamma', \alpha'$, and $\beta$, respectively, must be substituted for the angle $\gamma$, referred to in the said discussion for the case of spherical reflecting surface 47.

In the present embodiment of this invention, it is desirable to utilize light which passes through objective lens 64' and which is reflected from the appropriate spherical reflecting surfaces through any of the lenses 69' to 77', inclusive; 84' to 92', inclusive; 99' to 107', inclusive; 114' to 122', inclusive; 129' to 137', inclusive; and 144' to 152', inclusive. It is desirable to utilize light which passes through objective lens 65' and which is reflected from the appropriate spherical reflecting surfaces through any of the lenses 68' to 75', inclusive, 83' to 90', inclusive, 98' to 105', inclusive, 113' to 120', inclusive; 128' to 135', inclusive; and 143' to 150', inclusive. It is desirable to utilize light which passes through objective lens 66' and which is reflected from the appropriate spherical reflecting surfaces through any of the lenses 75' to 82', inclusive; 90' to 97', inclusive; 105' to 112', inclusive; 120' to 127', inclusive; 135' to 142', inclusive; and 150' to 157', inclusive. It is desirable to utilize light which passes through objective lens 67' and which is reflected from the appropriate spherical reflecting surface through any of the lenses 73' to 81', inclusive; 88' to 96', inclusive; 103' to 111', inclusive; 118' to 126', inclusive; 133' to 141', inclusive; and 148' to 156', inclusive. It will be noted that the specification of this paragraph provides two hundred and four combinations between objective lenses 64' to 67', inclusive, and lenses 68' to 157', inclusive. As will be made clear hereinafter, a photograph may be taken with each of these two hundred and four combinations. In order that these photographs may be equally spaced from each other in time, it is necessary that one of them be exposed for each angle of 1.76⁺ degrees through which the rotor 43 rotates. This angle will hereinafter be referred to as "¼ pitch." Arrangement of the lenses so that exposure of the two hundred and four photographs, one by one, with the proper timing, may be accomplished is done as follows:

The rotor 43, as shown in Fig. 1, is first assumed to be rotated to the right from the position shown in Fig. 1 through an angle of 0.88⁺ degree, or ⅛ pitch. With this particular position of the rotor, it has been found desirable, in the present embodiment of this invention, to utilize light which passes through objective lens 67' and which is reflected from spherical reflecting surface 41 through lenses 73' and 73. In order that light may follow this particular course at this time, the position of the image of objective lens 67' formed by spherical reflecting surface 47 when the surface 47 is in this particular position is computed, according to well known principles of spherical trigonometry, and the result is marked, on a chart similar to Fig. 3, as a position for lenses 73' and 73. Obviously, if the image of lens 67' falls on lens 73', most of the light which passes through lens 67' and strikes spherical reflecting surface 47 will pass through lenses 73' and 73. The rotor 43 is now rotated ¼ pitch farther to the right in Fig. 1. In the present embodiment of this invention, it is now desirable to utilize light which passes through objective lens 66' and which is reflected from spherical reflecting surface 47 through lenses 75' and 75. In order that light may follow this particular course at this time, the position of the image of objective lens 66' formed by spherical reflecting surface 47 when the surface 47 is in this particular position is computed and the result is marked, on the aforesaid chart, as a position for lenses 75' and 75. The rotor 43 is now rotated ¼ pitch farther to the right in Fig. 1. It is now desirable, in the present embodiment of this invention, to utilize light which passes through objective lens 67' and which is reflected from spherical reflecting surface 47 through lenses 74' and 74. Therefore, with the rotor in this position, a position is marked for lenses 74' and 74 in the same manner as for 73' and 73, above. This process is now continued, rotating the rotor 43 to the right in Fig. 1 by increments of ¼ pitch and, for each position of the rotor, marking a position on the chart for one of the pairs of lenses 75'—75 to 82'—82, inclusive, alternately utilizing the images of objective lenses 66' and 67'. This process is continued to, and including, a position of rotor 43 which is 4⅛ pitches to the right of the position shown in Fig. 1.

The rotor 43 is now turned an additional ¼ pitch to the right in Fig. 1 and, with the rotor in this position, utilizing the image of lens 64' formed by spherical reflecting surface 52, a position is marked on the chart for lenses 84' and 84. The rotor 43 is then turned ¼ pitch farther to the right in Fig. 1 and, utilizing the image of objective lens 65' formed by spherical reflecting surface 52, a position on the chart is marked for lenses 83' and 83. This process is now continued, rotating the rotor 43 to the right in Fig. 1 by increments of ¼ pitch and, for each position of the rotor, marking a position on the chart for one of the pairs of lenses 84'—84 to 92'—92, inclusive, alternately utilizing the images of objective lenses 64' and 65'. This process is continued to, and including, a position of rotor 43 which is 8⅜ pitches to the right of the position shown in Fig. 1. The process is now continued in a similar manner, always using ¼ pitch increments of rotation for rotor 43, as follows: From a position of the rotor 43 which is 8⅝ pitches to the right of the position shown in Fig. 1 to 12⅝ pitches to the right of the position shown in Fig. 1, inclusive, locations on the chart are marked for lens pairs 88'—88 to 97'—97, inclusive, alternately utilizing images of objective lenses 67' and 66' formed by spherical reflecting surface 52, beginning with image of lens 67'; from a position of the rotor 43 which is 12⅞ pitches to the right of the position shown in Fig. 1 to 16⅞ pitches to the right of the position shown in Fig. 1, inclusive, locations on the chart are marked for lens pairs 113'—113 to 122'—122, inclusive, alternately utilizing images of objective lenses 64' and 65' formed by spherical reflecting surface 51, beginning with image of lens 64'; from a position of the rotor 43 which is 17⅛ pitches to the right of the position shown in Fig. 1 to 21⅛ pitches to the right of the position shown in Fig. 1, inclusive, locations on the chart are marked for lens pairs 118'—118 to 127'—127, inclusive, alternately utilizing images of objective lenses 67' and 66' formed by spherical reflecting surface 51, beginning with image of lens 67'; from a position of the rotor 43 which is 21⅜ pitches to the right of the position shown in Fig. 1 to 25⅜ pitches to the right of the position shown in Fig. 1, inclusive, locations on the chart are marked for lens pairs 143'—143 to 152'—152, inclusive, alternately utilizing images of objective lenses 64' and 65' formed by spherical reflecting surface 50, beginning with image of lens 64'; from a position of the rotor 43 which is 25⅝ pitches to the right of the position shown in Fig. 1 to 29⅝ pitches to the right of the position shown in Fig. 1, inclusive, locations on the chart are marked for lens pairs 148'—148 to 157'—157, inclusive, alternately utilizing images of objective lenses 67' and 66' formed by spherical reflecting surface 50, beginning with image of lens 67'; from a position of the rotor 43 which is 29⅞ pitches to the right of the position shown in Fig. 1 to 33⅞ pitches to the right of the position shown in Fig. 1, inclusive, locations on the chart are marked for lens pairs 128'—128 to 137'—137, inclusive, alternately utilizing images of objective lenses 64' and 65' formed by spherical reflecting surface 49, beginning with image of lens 64'; from a position of the rotor 43 which is 34⅛ pitches to the right of the position shown in Fig. 1 to 38⅛ pitches to the right of the position shown in Fig. 1, inclusive, locations on the chart are marked for lens pairs 133'—133 to 142'—142, inclusive, alternately utilizing images of objective lenses 67' and 66' formed by spherical reflecting surface 49, beginning with image of lens 67'; from a position of the rotor 43 which is 38⅜ pitches to the right of the position shown in Fig. 1 to 42⅜ pitches to the right of the position shown in Fig. 1, inclusive, locations on the chart are marked for lens pairs 98'—98 to 107'—107, inclusive, alternately utilizing images of objective lenses 64' and 65' formed by spherical reflecting surface 48, beginning with image of lens 64'; from a position of the rotor 43 which is 42⅝ pitches to the right of the position shown in Fig. 1 to 46⅝ pitches to the right of the position shown in Fig. 1, inclusive, locations on the chart are marked for lens pairs 103'—103 to 112'—112, inclusive, alternately utilizing images of objective lenses 67' and 66' formed by spherical reflecting surface 48, beginning with image of lens 67'; and from a position of the rotor 43 which is 46⅞ pitches to the right of the position shown in Fig. 1 to 50⅞ pitches to the right of the position shown in Fig. 1, inclusive, locations on the chart are marked for lens pairs 68'—68 to 77'—77, inclusive, alternately utilizing images of objective lenses 64' and 65' formed by spherical reflecting surface 47, beginning with image of lens 64'. From the position of the rotor 43 which is 50⅞ pitches to the right of the position shown in Fig. 1, an additional turn of ¼ pitch to the right brings the rotor 43 to the starting position, which was ⅛ pitch to the right of the position shown in Fig. 1, there being fifty-one pitches to a complete revolution of the rotor 43.

It will now be seen that four positions have been marked, on the aforesaid chart, similar to Fig. 3, for each of the lens pairs 75'—75, 90'—90, 105'—105, 120'—120, 135'—135, and 150'—150. It will also be seen that three positions have been marked on the chart for each of the lens pairs 73'—73, 74'—74, 76'—76, 77'—77, 88'—88, 89'—89, 91'—91, 92'—92, 103'—103, 104'—104, 106'—106, 107'—107, 118'—118, 119'—119, 121'—121, 122'—122, 133'—133, 134'—134, 136'—136, 137'—137, 148'—148, 149'—149, 151'—151, and 152'—152. It will be seen that two positions have been marked for each of the lens pairs 69'—69 to 72'—72, inclusive; 78'—78 to 81'—81, inclusive; 84'—84 to 87'—87, inclusive; 93'—93 to 96'—96, inclusive; 99'—99 to 102'—102, inclusive; 108'—108 to 111'—111, inclusive; 114'—114 to 117'—117, inclusive, 123'—123 to 126'—126, inclusive; 129'—129 to 132'—132, inclusive; 138'—138 to 141'—141, inclusive; 144'—144 to 147'—147, inclusive; and 153'—153 to 156'—156, inclusive. It will be seen that only one position has been marked for each of the lens pairs 68'—68, 82'—82, 83'—83, 97'—97, 98'—98, 112'—112, 113'—113, 127'—127, 128'—128, 142'—142, 143'—143, and 157'—157. It has been found, in the present embodiment of this invention, in each case where two, three, or four positions are marked for lenses in Fig. 3, that these positions are very close together and that placing each of the lenses in a median position with respect to the positions marked for it gives very satisfactory results.

On the inside of spherical shell 40, which is concentric with wall 63, are secured thirty film-holding strips 14, as shown in Figs. 1 and 2. Within the recesses of these strips, through the grooves 33 in strips 41, see Fig. 11, are inserted fifteen strips of photosensitive film, each strip extending from the top to the bottom of the spherical shell 40, as shown in Fig. 2. The lenses of each pair 68'—68 to 157'—157, inclusive, are of such focal lengths that they form an image of spherical reflecting surface 47, or any other spherical reflecting surface 48 to 52, inclusive, when such reflecting surface is in the position shown for surface 47 in Fig. 1, on one of the photosensitive film strips 35. One of the film strips 35 is placed in such position that all images of spherical reflecting surfaces 47 to 52 formed by lens pairs 68'—68, 83'—83, 98'—98, 113'—113, 128'—128, and 143'—143 will fall upon it. Another of the film strips 35 is similarly placed with reference to lens pairs 69'—69, 84'—84, 99'—99, 114'—114, 129'—129, and 144'—144. The remaining thirteen photosensitive film strips 35 are similarly placed with reference to the remaining thirteen vertical rows of lenses shown in Fig. 3.

Referring now to Fig. 10, in which rotor 43 is shown in the same position as in Figs. 1 and 2, the numeral 59 represents an image of the object which it is desired to photograph, formed on the spherical reflecting surface 47 by the objective lens pair 64—64'. The numeral 60 represents a similar image formed by the objective lens pair 65—65'. The numeral 61 represents a similar image formed by objective lens pair 66—66'. The numeral 62 represents a similar image formed by objective lens pair 67—67'. Images 59 and 60 may be interchanged in position, as may images 61 and 62, without altering the nature of this invention. However, it is not desirable, in the present embodiment of this invention, that images 59 and 61 be interchanged or that images 60 and 62 be interchanged. It is to be understood that all of the images 59, 60, 61, and 62 remain substantially stationary in space as the rotor 11 turns. This being the case, images formed on photosensitive film strips 35, corresponding to the images 59 to 62, inclusive, will not move appreciably relative to said photosensitive film strips, in spite of the rotation of the reflected beams of light from spherical reflecting surfaces 47 to 52, inclusive. It is apparent that each of the lens pairs 68'—68 to 157'—157, inclusive, will form images corresponding to images 59 to 62, inclusive, on photosensitive film strips 35. Moreover, if the images 59 to 62, inclusive, are made sufficiently small, the corresponding images formed by lens pairs 68'—68 to 157'—157 will all fall in different positions on the film strips 35 and will not overlap each other. It is also clear that any one of the images on photosensitive film strips 35, corresponding to image 59, will be illuminated by light reflected specularly from spherical reflecting surface 47, or any other spherical reflecting surface 48 to 52, inclusive, only when the image of objective lens 64' formed by such spherical reflecting surface falls on a particular one of the lenses 68' to 157', inclusive. A similar statement applies for image 60 and objective lens 65', for image 61 and objective lens 66', and for image 62 and objective lens 67'. Consequently, in the present embodiment of this invention, a full image, corresponding to one of the images 59, 60, 61, or 62, will be illuminated by specular reflection from one of the spherical reflecting surfaces 47 to 52, inclusive, for each ¼ pitch turn of the rotor 43; or two hundred and four such images will be illuminated by specular reflection during one complete turn of rotor 43. It will be seen that partial images will be formed when the junctions between different spherical reflecting surfaces 47 to 52, inclusive, are passing across images 59, 60, 61, or 62. Such partial images will fall on different parts of photosensitive film strips 35 from the full images above mentioned. In practical use of this device, the partial images are simply discarded. In some cases, with some of the centrally located lenses, two full images, corresponding to images 59 and 61, or images 60 and 62, will be illuminated by specular reflection simultaneously. In these cases, the better pictures may be selected for use and the others discarded.

It is clear that images will be formed by all lens pairs 68'—68 to 157'—157, inclusive, by diffuse reflection from the spherical reflecting surfaces 47 to 52, inclusive, at all times when images 59 to 62, inclusive, are being formed on the rotor 43 by objective lens pairs 64—64' to 67—67', inclusive. However, if the spherical reflecting surfaces 47 to 52, inclusive, are fairly good reflecting surfaces, the quantity of light reaching the images on photosensitive film strips 35 by specular reflection will be so much greater than that reaching these images by diffuse reflection that the effect of the diffuse reflection will not be important, light being allowed to pass through objective lenses 64' to 67', inclusive, only for the time required for rotor 43 to make one complete turn.

The foregoing description makes clear the essential features of my present invention, and it now remains only to describe the apparatus required in order that objective lens pairs 64—64', 65—65', 66—66', and 67—67' may form, on the rotor 43, illuminated images 59, 60, 61, and 62, respectively, of a single object, throughout the time of a single revolution of the rotor 43 and no longer.

It is obvious to one skilled in the art that there are many possible arrangements of mirrors or refracting elements which might be placed between the object to be photographed and each of the objective lens pairs 64—64' to 67—67', inclusive, and adjusted in such a manner that these lens pairs would form the images 59 to 62 in the proper respective positions. It is also obvious to one skilled in the art that there are many possible shutter arrangements by which light could be permitted to pass through the objective lens pairs 64—64' to 67—67', inclusive, throughout the time required for one revolution of the rotor 43 and no longer. A preferred type of such shutter arrangement, represented in the drawings, for use at extreme high speeds, operates on the same principle as the essential parts of the camera itself, as hereinbefore described, with only slight modification.

Referring to Fig. 2 of the drawings, the numeral 21 indicates one of a group of four objective lenses, which are arranged side-by-side along a line perpendicular to the plane of Fig. 2, as is made clear in Fig. 12. Each of these objective lenses 21 is placed in a hole 46 which is drilled through wall 42. The spacing between adjacent lenses 21 is equal to the spacing between adjacent mirrors 17, multiplied by the ratio $x/y$, in which $x$ is the total length of optical path from any objective lens 21 to the intermediate lens 18 and $y$ is the total length of optical path from the intermediate lens 18 to any mirror 17. Each of the objective lenses 21 is of such a focal length and is so placed as to form an image of the object to be photographed on the flat mirror surface 158 when such mirror surface is in the position shown in Fig. 2. The four images formed by the four objective lenses 21 may, by any of numerous means well known in the art, be super-imposed upon each other on the reflecting surface 158, or they may be arranged to fall side-by-side on reflecting surface 158.

Flat mirror surface 158 is an integral part of rotor 19, see Figs. 2, 4, 5, 8, and 9. Rotor 19 is rotatably mounted on end supports 16 and 25, which in turn are rotatably mounted in side plates 26 and 53, respectively. End supports 16 and 25 are interconnected by torsion spring 44, which is rigidly attached to each of the end supports 16 and 25. Integral with end support 25 is lever arm 161 by which the end support 25 can be located in a definite angular position by means of the pin 54 which is inserted through holes in lever arm 161 and side plate 53. These holes are so located that when the pin 54 is inserted and the torsion spring 44 is unstressed the end support 16 will be rotated somewhat to the left of the position shown in Fig. 4. End support 16 has two projections 159 which engage the triangular projections 160 of the rotor 19 in such manner that the rotor 19 can rotate approximately 90° to the left of the position shown in Fig. 4 without any rotation of the end support 16 but that the rotor 19 cannot rotate to the right of the position shown in Fig. 4 without an equivalent rotation of the end support 16.

Integral with rotor 19 is projection 162, which is engaged by projection 45 on lever 24. Lever 24 is attached in any suitable manner to the framework of the camera so that when it is desired to expose the series of two hundred and four pictures, the lever 24 may be raised from the position shown in Fig. 4, disengaging the projection 45 from the projection 162. In order to set the shutter mechanism for operation, the pin 54 is removed, the rotor 19 is turned to the right to the position shown in Fig. 4, and the lever 24 is depressed, causing the projection 45 to engage the projection 162. The end support 25 is then rotated to such a position that the pin 54 can be reinserted. After insertion of the pin 54 the torsion spring 44 is in a stressed condition. Raising of the lever 24 allows the torsion spring 44, acting through the end support 16 and its projections 159, to rotate the rotor 19 to the left from the position shown in Fig. 4. When the torsion spring 44 reaches its unstressed condition, rotation of the end support 16 ceases, but the rotor 19 continues to turn throughout a total of about 90°. Any suitable damping arrangement may be provided to prevent the rotor 19 from bouncing back objectionably toward its original position.

It will be noted that the 90° rotation of rotor 19 to the left from the position shown in Fig. 4 will carry this rotor through the angular position shown for it in Fig. 2. When the rotor is in the angular position shown in Fig. 2, light falling on the mirror face 158 from the objective lenses 21 is reflected through lens 18 to flat mirror surfaces 17 and hence to objective lenses 64 to 67, inclusive. The lens 18, mounted in holder 30 in bottom plate 39 by means of retainers 31 and 32, is of such a focal length that it will produce images of the four objective lenses 21 on the four objective lenses 64 to 67, respectively. An alternate position for the lens 18 is that of lens 164, Fig. 2, or lenses 18 and 164 may both be used, in which case their combined focal length should be such as to produce images of the four objective lenses 21 on the four objective lenses 64 to 67, respectively. Obviously, as rotor 19 rotates through 90° to the left from the position shown in Fig. 4, images of the four objective lenses 21 will move across the objective lenses 64 to 67, respectively, and the images 59 to 62, inclusive, on the rotor 43, will be brightly illuminated only during the time that the images of objective lenses 21 are actually on the objective lenses 64 to 67.

If lever 24, with its projection 45, is moved to the right of the position shown in Fig. 4, obviously the torsion spring 44 will be more greatly stressed and the rotor 19 will acquire a greater velocity upon release. Conversely, if the lever 24 is moved to the left of the position shown in Fig. 4, the rotor 19 will acquire less velocity upon release. For any given speed of the rotor 43, it is necessary to adjust the position of lever 24 with its projection 45 so that the rotor 19 will acquire just sufficient velocity that the images of objective lenses 21 will sweep across objective lenses 64 to 67, respectively, in just the time required for one complete revolution of rotor 43.

Mirrors 17 are attached to support 15, which is rigidly attached to wall 63, see Fig. 1. These mirrors 17 are so adjusted as to place images 59 to 62, inclusive, in their proper positions on rotor 43. The images 59 to 62, inclusive, are secondary images of the primary images formed on flat mirror surface 158 by objective lenses 21.

Projection 29 on wall 42 supports sliding shutter 20. This may be any type of low-speed shutter and is intended only to prevent light from entering chamber 57 and diffusing through lens 18 into chamber 56 and hence to photosensitive film strips 35 during the time before and after operation of the hereinbefore described high-speed shutter mechanism. This shutter 20 is opened just before operation of the high-speed shutter mechanism and is closed just afterwards.

It will be understood that the scope of this invention is not limited to the use of a rotor 43 having six reflecting surfaces, or to the use of image lenses arranged in six banks, as it is obvious that any other number of reflecting surfaces on rotor 43 may be used, with a corresponding number of banks of image lenses. It will be obvious to one skilled in the art that various combinations may be made of the features embodied in that portion of the optical path of this device extending from objective lenses 21 through lens 164, rotor 19, lens 18, and mirrors 17 to lenses 64 to 67, inclusive, with the features embodied in that portion of the optical path extending from lenses 64' to 67', inclusive, through lens 163, reflecting surfaces 47 to 52, inclusive, lens 163, lenses 68' to 157', inclusive, and lenses 68 to 157, inclusive, to film strips 35, and it is intended that the scope of this invention should include these obvious combinations.

Also, this invention is not limited to the use of four objective lens pairs 64—64' to 67—67', inclusive, and to the use of four corresponding objective lenses 21, as it is obvious that any other even number of objective lenses could be used without departing from the spirit of the invention. Use of objective lens positions in pairs, as 64' and 66', forming pairs of images on rotor 43, as 59 and 61, is necessary in order that photographs of the complete object may be taken by means of one of these images at times when an intersection of reflecting faces on rotor 43 is passing across the other of the images. Although the use of the objective lens positions in pairs is therefore essential to the perfected form of my present invention, it will be understood that the scope of this invention also covers the hereinbefore described method of producing a series of stationary images displaced from each other in time and position on the film with use of only a single objective lens, as lens 64', as well as with only a single rotating reflecting surface, as 47, with only a single bank of image lenses, as 68' to 82', inclusive. It is obvious that the number of image lens pairs in a bank, as 68'—68 to 82'—82, inclusive, is arbitrary and that any desired number may be used without departing from the spirit of the invention. It is also obvious that the total number of pictures to be taken with a single rotation of the rotor 43 is arbitrary and that the number may be changed as desired without affecting the spirit of the invention, the number of pictures to be taken with one rotation of rotor 43 being a function of the number and arrangement of objective lenses, as lenses 64' to 67', inclusive, the number of rotating reflecting faces, as faces 47 to 52, inclusive, and the number and arrangement of image lens pairs, as 68'—68 to 157'—157, inclusive. It is obvious to one skilled in the art that numerous arrangements of objective lenses 64' to 67', inclusive, and of image lens pairs 68'—68 to 157'—157, inclusive, are possible without departing from the spirit of my invention; particularly as concerns the spacing between objective lenses 64' to 67', inclusive.

Other modifications and changes in the number and arrangement of the parts may be made by those skilled in the art without departing from the nature of the invention, within the scope of what is hereinafter claimed.

The invention described herein may be manufactured and used by or for the Government of the United States of America for governmental purposes without the payment of any royalties thereon or therefor.

What is claimed is:

1. In a device for taking pictures, means for bringing light from the object to a focus to form a stationary primary image, means for reflecting the beam of light which forms said stationary primary image and for rotating the reflected light beam approximately about said stationary primary image as a center, and means for intercepting said reflected light beam at various angular positions and re-focusing said reflected light beam to form a series of stationary secondary images displaced from each other in time and in position on a photosensitive film.

2. In a device for taking pictures, means for bringing light from the object to a focus to form a stationary primary image, means for reflecting the beam of light which forms said stationary primary image, for rotating the reflected light beam approximately about said stationary primary image as a center, and for so focusing the reflected light beam that it shall be of small cross section at a relatively great distance from said reflecting, rotating, and focusing means, and means for intercepting said reflected light beam at the point of aforesaid small cross section of beam at various angular positions of the beam and for re-focusing said reflected light beam to form a series of stationary secondary images displaced from each other in time and in position on a photosensitive film.

3. In a device for taking pictures, means for bringing light from the object to a focus to form a stationary primary image, means for reflecting the beam of light which forms said stationary primary image, for rotating the reflected light beam approximately about said stationary primary image as a center, and for focusing the reflected light beam to form an image, at a definite distance from said reflecting, rotating, and focusing means, of the aforesaid means for forming stationary primary image, thereby causing the reflected light beam to be of small cross section at a relatively great distance from said reflecting, rotating, and focusing means, and means for intercepting said reflected light beam at the point of aforesaid small cross section of beam at various angular positions of the beam and for re-focusing said reflected light beam to form a series of stationary secondary images displaced from each other in time and in position on a photosensitive film.

4. In a device for taking pictures, means comprising an objective lens for bringing light from the object to a focus to form a stationary primary image, means comprising a rotating or revolving mirror for reflecting the beam of light which forms said stationary primary image and for rotating the reflected light beam approximately about said stationary primary image as a center, and means comprising a multiplicity of optical lenses circularly disposed about aforesaid reflecting and rotating means for intercepting the reflected light beam at various angular positions and re-focusing the reflected light beam to form a series of stationary secondary images displaced from each other in time and in position on a photosensitive film.

5. In a device for taking pictures, means comprising an objective lens for bringing light from the object to a focus to form a stationary primary image, means comprising a rotating or revolving concave spherical mirror for reflecting the beam of light which forms said stationary primary image, for rotating the reflected light beam approximately about said stationary primary image as a center, and for focusing the reflected light beam to form an image, at a definite distance from the said reflecting, rotating, and focusing means of the aforesaid means for forming stationary primary image, thereby causing the reflected light beam to be of small cross section at a relatively great distance from said reflecting, rotating, and focusing means, and means comprising a multiplicity of optical lenses circularly disposed about aforesaid reflecting, rotating, and focusing means for intercepting said reflected light beam at the point of aforesaid small cross section of beam at various angular positions of the beam and for re-focusing said reflected light beam to form a series of stationary secondary images displaced from each other in time and in position on a photosensitive film.

6. In a device for taking pictures, means for bringing light from the object to a focus to form a pair of stationary primary images arranged side-by-side, means for reflecting each of the beams of light which form said pair of stationary primary images along a multiplicity of rotating axes, one axis after another, such rotating axes generating different surfaces, each of such surfaces being a portion of the surface of an approximate cone, the location of the apex of each such approximate cone being approximately the same as the location of the aforesaid pair of stationary primary images, in such a manner that the entire beam forming one of the pair of stationary primary images shall be reflected along one of the said rotating axes at any time when the reflection of the beam forming the other one of the pair of stationary primary images is being transferred from one to another of the said rotating axes, and means disposed at various angular positions along the surface of each of the aforesaid approximate cones for intercepting each light beam of the reflected pair and re-focusing said light beam to form a series of stationary secondary images displaced from each other in time and in position on stationary photosensitive film, such stationary secondary images formed by the light of one of the reflected beams being full images at all times when the stationary secondary images formed by the light of the other reflected beam are partial because of the aforementioned condition of one beam being reflected entirely along one rotating axis while the other reflected beam is being transferred from one rotating axis to another.

7. In a device for taking pictures, means for bringing light from the object to a focus to form a pair of stationary primary images arranged side-by-side, means for reflecting each of the beams of light which form said pair of stationary primary images along a multiplicity of rotating axes, one axis after another, such rotating axes generating different surfaces, each of such surfaces being a portion of the surface of an approximate cone, the location of the apex of each such approximate cone being approximately the same as the location of the aforesaid pair of stationary primary images, in such a manner that the entire beam forming one of the pair of stationary primary images shall be reflected along one of the said rotating axes at any time when the reflection of the beam forming the other one of the pair of stationary primary images is being transferred from one to another of the said rotating axes, and for focusing the reflected light beams in such a manner that they shall be of small cross section at a relatively great distance from said reflecting, rotating, and focusing means, and means disposed at various angular positions along the surface of each of the aforesaid approximate cones for intercepting each light beam of the reflected pair at the point of aforesaid small cross section of beam and re-focusing it to form a series of stationary secondary images displaced from each other in time and in position on stationary photosensitive film, such stationary secondary images formed by the light of one of the reflected beams being full images at all times when the stationary secondary images formed by the light of the other reflected beam are partial because of the aforementioned condition of one beam being reflected entirely along one rotating axis while the other reflected beam is being transferred from one rotating axis to another.

8. In a device for taking pictures, means for bringing light from the object to a focus to form a pair of stationary primary images arranged side-by-side, means for reflecting each of the beams of light which form said pair of stationary primary images along a multiplicity of rotating axes, one axis after another, such rotating axes generating different surfaces, each of such surfaces being a portion of the surface of an approximate cone, the location of the apex of each such approximate cone being approximately the same as the location of the aforesaid pair of stationary primary images, in such a manner that the entire beam forming one of the pair of stationary primary images shall be reflected along one of the said rotating axes at any time when the reflection of the beam forming the other one of the pair of stationary primary images is being transferred from one to another of the said rotating axes, and for focusing the reflected light beams to form images, at a definite distance from said reflecting, rotating, and focusing means, of the aforesaid means for forming a pair of stationary primary images, thereby causing the reflected light beams to be of small cross section at a relatively great distance from said reflecting, rotating, and focusing means, and means disposed at various angular positions along the surface of each of the aforesaid approximate cones for intercepting each light beam of the reflected pair at the point of aforesaid small cross section of beam and re-focusing it to form a series of stationary secondary images displaced from each other in time and in position on stationary photosensitive film, such stationary secondary images formed by the light of one of the reflected beams being full images at all times when the stationary secondary images formed by the light of the other reflected beam are partial because of the aforementioned condition of one beam being reflected entirely along one rotating axis while the other reflected beam is being transferred from one rotating axis to another.

9. In a device for taking pictures, means comprising a pair of objective lenses for bringing light from the object to a focus to form a pair of stationary primary images arranged side-by-side, means for reflecting each of the beams of light which form said pair of stationary primary images along a multiplicity of rotating axes, one axis after another, such rotating axes generating different surfaces, each of such surfaces being a portion of the surface of an approximate cone, the location of the apex of each such approximate cone being approximately the same as the location of the aforesaid pair of stationary primary images, said reflecting and rotating means comprising a rotor having a multiplicity of reflecting faces disposed at various angular positions about the periphery of said rotor, each of such reflecting faces making a different angle with the axis of rotation of said rotor, such reflecting faces being arranged so that one complete image of the aforesaid pair of stationary primary images falls on one of the said reflecting faces at any time when the other image of the pair is falling on the intersection of two of said reflecting faces, and means comprising a multiplicity of optical lenses disposed at various angular positions along the surface of each of the aforesaid approximate cones for intercepting each light beam of the reflected pair and re-focusing it to form a series of stationary secondary images displaced from each other in time and in position on stationary photosensitive film, such stationary secondary images formed by the light of one of the reflected beams being full images at all times when the stationary secondary images formed by the light of the other reflected beam are partial because of the aforementioned condition that at all times one or the other of the aforesaid pair of stationary primary images falls entirely on one of the reflecting faces of the aforesaid rotor.

10. In a device for taking pictures, means comprising a pair of objective lenses for bringing light from the object to a focus to form a pair of stationary primary images arranged side-by-side, means for reflecting each of the beams of light which form said pair of stationary primary images along a multiplicity of rotating axes, one axis after another, such rotating axes generating different surfaces, each of such surfaces being a portion of the surface of an approximate cone, the location of the apex of each such approximate cone being approximately the same as the location of the aforesaid pair of stationary primary images, and for focusing the reflected beams to form images, at a definite distance from said reflecting, rotating, and focusing means of the aforesaid means for forming a pair of stationary primary images, thereby causing the reflected light beams to be of small cross section at a relatively great distance from said reflecting, rotating, and focusing means, said reflecting, rotating, and focusing means comprising a rotor having a multiplicity of concave spherical reflecting faces disposed at various angular positions about the periphery of said rotor, the optical axis of each such concave spherical reflecting face making a different angle with the axis of rotation of said rotor, such concave spherical reflecting faces being arranged so that one complete image of the aforesaid pair of stationary primary images falls on one of the said concave spherical reflecting faces at any time when the other image of the pair is falling on the intersection of two of said concave spherical reflecting faces, and means comprising a multiplicity of optical lenses, disposed at various angular positions along the surface of each of the aforesaid approximate cones for intercepting each light beam of the reflected pair, at the point of aforesaid small cross section of beam, and for re-focusing each light beam to form a series of stationary secondary images displaced from each other in time and in position on stationary photosensitive film, such stationary secondary images formed by the light of one of the reflected beams being full images at all times when the stationary secondary images formed by the light of the other reflected beam are partial because of the aforementioned condition that at all times one or the other of the aforesaid pair of stationary primary images falls entirely on one of the reflecting faces of the aforesaid rotor.

11. In a device for taking pictures, means for bringing light from the object to a focus to form a plurality of stationary primary images arranged adjacently means for reflecting the beams of light which form said stationary primary images and for rotating the reflected light beams approximately about said stationary primary images as a center, and means for intercepting each of said reflected light beams at various angular positions of the beam in such a manner that the interceptions of the reflected beam corresponding to any particular one of the aforesaid stationary primary images shall intersperse the interceptions of the reflected beam corresponding to any other one of the aforesaid stationary primary images and for re-focusing each of said reflected light beams to form a series of stationary secondary images displaced from each other in time and in position on photosensitive film.

12. In a device for taking pictures, means for bringing light from the object to a focus to form a plurality of stationary primary images arranged adjacently means for reflecting the beams of light which form said stationary primary images, for rotating the reflected light beams approximately about said stationary primary images as a center, and for so focusing the reflected light beams that they shall be of small cross section at a relatively great distance from said reflecting, rotating, and focusing means, and means for intercepting each of said reflected light beams, at the point of aforesaid small cross section of beam, at various angular positions of the beams, in such a manner that the interceptions of the reflected beam corresponding to any particular one of the aforesaid stationary primary images shall intersperse the interceptions of the reflected beam corresponding to any other one of the aforesaid stationary primary images and for re-focusing each of said reflected light beams to form a series of stationary secondary images displaced from each other in time and in position on photosensitive film.

13. In a device for taking pictures, means for bringing light from the object to a focus to form a plurality of stationary primary images arranged adjacently means for reflecting the beams of light which form said stationary primary images, for rotating the reflected light beams approximately about said stationary primary images as a center and for focusing the reflected light beams to form images, at a definite distance from said reflecting, rotating, and focusing means, of the aforesaid means for forming stationary primary images, thereby causing the reflected light beams to be of small cross section at a relatively great distance from said reflecting, rotating, and focusing means, and means for intercepting each of said reflected light beams at the point of aforesaid small cross section of beam, at various angular positions of the beams, in such a manner that the interceptions of the reflected beam corresponding to any particular one of the aforesaid stationary primary images shall intersperse the interceptions of the reflected beam corresponding to any other one of the aforesaid stationary primary images and for re-focusing each of said reflected light beams to form a series of stationary secondary images displaced from each other in time and in position on photosensitive film.

14. In a device for taking pictures, means comprising a plurality of objective lenses for bringing light from the object to a focus to form two or more stationary primary images arranged adjacently, means comprising a rotating mirror for reflecting the beams of light which form said stationary primary images and for rotating the reflected light beams approximately about said stationary primary images as a center, and means comprising a multiplicity of optical lenses, circularly disposed about aforesaid reflecting and rotating means, for intercepting each of said reflected light beams at various angular positions of the beams in such a manner that the interceptions of the reflected beam corresponding to any particular one of the aforesaid stationary primary images shall intersperse the interceptions of the reflected beam corresponding to any other one of the aforesaid stationary primary images and for re-focusing each of said reflected light beams to form a series of stationary secondary images displaces from each other in time and in position on photosensitive film.

15. In a device for taking pictures, means comprising two or more objective lenses for bringing light from the object to a focus to form two or more stationary primary images arranged adjacently, means comprising a rotating concave spherical mirror for reflecting the beams of light which form said stationary primary images, for rotating the reflected light beams approximately about said stationary primary images as a center, and for focusing the reflected light beams to form images, at a definite distance from said reflecting, rotating, and focusing means, of the aforesaid means for forming stationary primary images, thereby causing the reflected light beams to be of small cross section at a relatively great distance from said reflecting, rotating, and focusing means, and means comprising a multiplicity of optical lenses circularly disposed about aforesaid reflecting, rotating, and focusing means for intercepting said reflected light beams at the point of aforesaid small cross section of beam at various angular positions of the beams in such a manner that the interceptions of the reflected beam corresponding to any particular one of the aforesaid stationary primary images shall intersperse the interceptions of the reflected beam corresponding to any other one of the aforesaid stationary primary images and for re-focusing each of said reflected light beams to form a series of stationary secondary images displaced from each other in time and in position on photosensitive film.

16. In a device for taking pictures, means for bringing light from the object to a focus to form two or more pairs of stationary primary images, the two images of each pair being arranged side-by-side and the different pairs of images being displaced from each other in a direction at right angles to the direction of displacement of the individual images of each pair, means for reflecting each of the beams of light which form said two or more pairs of stationary primary images along a multiplicity of rotating axes, one axis after another, such rotating axes generating different surfaces, each such surface being a portion of the surface of an approximate cone, the location of the apex of each such approximate cone being approximately the same as the location of the aforesaid two or more pairs of stationary primary images, in such a manner that the entire beam forming one of the images of any particular pair of stationary primary images shall be reflected along one of the said rotating axes at any time when the reflection of the beam forming the other image of that pair of stationary primary images is being transferred from one to another of the said rotating axes, and means disposed at various angular positions along the surface of each of the aforesaid approximate cones for intercepting each of the reflected light beams in such a manner that the interceptions of the reflected beams corresponding to any particular pair of aforesaid stationary primary images shall intersperse the interceptions of the reflected beams corresponding to any other pair of the aforesaid stationary primary images and for re-focusing each reflected light beam to form a series of stationary secondary images displaced from each other in time and in position on photosensitive film, such stationary secondary images formed by the reflected light beam corresponding to one of each pair of stationary primary images being full images at all times when the stationary secondary images formed by the reflected light beam corresponding to the other one of that pair of stationary primary images are partial because of the aforementioned condition of one beam of each pair being reflected entirely along one rotating axis while the other reflected beam of that pair is being transferred from one rotating axis to another.

17. In a device for taking pictures, means for bringing light from the object to a focus to form two or more pairs of stationary primary images, the two images of each pair being arranged side-by-side, and the different pairs of images being displaced from each other in a direction at right angles to the direction of displacement of the individual images of each pair, means for reflecting each of the beams of light which form said two or more pairs of stationary primary images along a multiplicity of rotating axes, one axis after another, such rotating axes generating different surfaces, each such surface being a portion of the surface of an approximate cone, the location of the apex of each such approximate cone being approximately the same as the location of the aforesaid two or more pairs of stationary primary images, in such a manner that the entire beam forming one of the images of any particular pair of stationary primary images shall be reflected along one of the said rotating axes at any time when the reflection of the beam forming the other image of that pair of stationary primary images is being transferred from one to another of the said rotating axes and for focusing the reflected light beams in such a manner that they shall be of small cross section at a relatively great distance from said reflecting, rotating, and focusing means, and means disposed at various angular positions along the surface of each of the aforesaid approximate cones for intercepting each of the reflected light beams, at the point of aforesaid small cross section of beam, in such a manner that the interceptions of the reflected beams corresponding to any particular pair of aforesaid stationary primary images shall intersperse the interceptions of the reflected beams corresponding to any other pair of aforesaid stationary primary images and for re-focusing each reflected light beam to form a series of stationary secondary images displaced from each other in time and in position on photosensitive film, such stationary secondary images formed by the reflected light beam corresponding to one of each pair of stationary primary images being full images at all times when the stationary secondary images formed by the reflected light beam corresponding to the other one of that pair of stationary primary images are partial because of the aforementioned condition of one beam of each pair being reflected entirely along one rotating axis while the other reflected beam of that pair is being transferred from one rotating axis to another.

18. In a device for taking pictures, means for bringing light from one object to a focus to form a plurality of pairs of stationary primary images, the two images of each pair being arranged side-by-side, and the different pairs of images being displaced from each other in a direction at right angles to the direction of displacement of the individual images of each pair, means for reflecting each of the beams of light which form said plurality of pairs of stationary primary images along a multiplicity of rotating axes, one axis after another, such rotating axes generating different surfaces, each such surface being a portion of the surface of an approximate cone, the location of the apex of each such approximate cone being approximately the same as the location of the aforesaid plurality of pairs of stationary primary images, in such a manner that the entire beam forming one of the images of any particular pair of stationary primary images shall be reflected along one of the said rotating axes at any time when the reflection of the beam forming the other image of that pair of stationary primary images is being transferred from one to another of the said rotating axes and for focusing the reflected light beams to form images, at a definite distance from said reflecting, rotating, and focusing means, of the aforesaid means for forming the plurality of pairs of stationary primary images, thereby causing the reflected light beams to be of small cross section at a relatively great distance from said reflecting, rotating, and focusing means, and means disposed at various angular positions along the surface of each of the aforesaid approximate cones for intercepting each of the reflected light beams, at the point of aforesaid small cross section of beam, in such a manner that the interceptions of the reflected beams corresponding to any particular pair of aforesaid stationary primary images shall intersperse the interceptions of the reflected beams corresponding to any other pair of aforesaid stationary primary images and for re-focusing each reflected light beam to form a series of stationary secondary images displaced from each other in time and in position on photosensitive film, such stationary secondary images formed by the reflected light beam corresponding to one of each pair of stationary primary images being full images at all times when the stationary secondary images formed by the reflected light beam corresponding to the other one of that pair of stationary primary images are partial because of the aforementioned condition of one beam of each pair being reflected entirely along one rotating axis while the other reflected beam of that pair is being transferred from one rotating axis to another.

19. In a device for taking pictures, means comprising two or more pairs of objective lenses for bringing light from the object to a focus to form a plurality of pairs of stationary primary images, the two images of each pair being arranged side-by side and the different pairs of images being displaced from each other in a direction at right angles to the direction of displacement of the individual images of each pair, means for reflecting each of the beams of light which form said plurality of pairs of stationary primary images along a multiplicity of rotating axes, one axis after another, such rotating axes generating different surfaces, each such surface being a portion of the surface of an approximate cone, the location of the apex of each such approximate cone being approximately the same as the location of the aforesaid plurality of pairs of stationary primary images, said reflecting and rotating means comprising a rotor having a multiplicity of reflecting faces disposed at various angular positions about the periphery of said rotor, each such reflecting face making a different angle with the axis of rotation of said rotor, such reflecting faces being arranged so that one complete image of each one of the aforesaid pairs of stationary primary images falls on one of the said reflecting faces at any time when the other image of that pair is falling on the intersection of two of said reflecting faces, and means comprising a multiplicity of optical lenses disposed at various angular positions along the surface of each of the aforesaid approximate cones for intercepting each of the reflected light beams in such a manner that the interceptions of the reflected beams corresponding to any particular pair of aforesaid stationary primary images shall intersperse the interceptions of the reflected beams corresponding to any other pair of aforesaid stationary primary images and for re-focusing each reflected light beam to form a series of stationary secondary images displaced from each other in time and in position on photosensitive film, such stationary secondary images formed by the reflected light beam corresponding to one of each pair of stationary primary images being full images at all times when the stationary secondary images formed by the reflected light beam corresponding to the other one of that pair of stationary primary images are partial because of the aforementioned condition that at all times one image or the other of each of the aforesaid pairs of stationary primary images falls entirely on one of the reflecting faces of the aforesaid rotor.

20. In a device for taking pictures, means comprising a plurality of pairs of objective lenses for bringing light from the object to a focus to form two or more pairs of stationary primary images, the two images of each pair being arranged side-by-side and the different pairs of images being displaced from each other in a direction at right angles to the direction of displacement of the individual images of each pair, means for reflecting each of the beams of light which form said plurality of pairs of stationary primary images along a multiplicity of rotating axes, one axis after another, such rotating axes generating different surfaces, each of such surfaces being a portion of the surface of an approximate cone, the location of the apex of each such approximate cone being approximately the same as the location of the aforesaid pair of stationary primary images, and for focusing the reflected beams to form images, at a definite distance from said reflecting, rotating, and focusing means, of the aforesaid means for forming the plurality of pairs of stationary primary images, thereby causing the reflected light beams to be of small cross section at a relatively great distance from said reflecting, rotating, and focusing means, said reflecting, rotating, and focusing means comprising a rotor having a multiplicity of concave spherical reflecting faces disposed at various angular positions about the periphery of said rotor, the optical axis of each such concave spherical reflecting face making a different angle with the axis of rotation of said rotor, such concave spherical reflecting faces being arranged so that one complete image of each one of the aforesaid pairs of stationary primary images falls on one of the said concave spherical reflecting faces at any time when the other image of that pair is falling on the intersection of two of said concave spherical reflecting faces, and means comprising a multiplicity of optical lenses disposed at various angular positions along the surface of each of the aforesaid approximate cones for intercepting each of the reflected light beams, at the point of aforesaid small cross section of beam, in such a manner that the interceptions of the reflected beams corresponding to any particular pair of aforesaid stationary primary images shall intersperse the interceptions of the reflected beams corresponding to any other pair of aforesaid stationary primary images and for re-focusing each reflected light beam to form a series of stationary secondary images displaced from each other in time and in position on photosensitive film, such stationary secondary images formed by the reflected light beam corresponding to one of each pair of stationary primary images being full images at all times when the stationary secondary images formed by the reflected light beam corresponding to the other one of that pair of stationary primary images are partial because of the aforementioned condition that at all times one image or the other of each of the aforesaid pairs of stationary primary images falls entirely on one of the reflecting faces of the aforesaid rotor.

21. In a device for taking pictures, means comprising an objective lens for bringing light from the object to a focus to form a stationary primary image, means comprising a rotating mirror for reflecting the beam of light which forms said stationary primary image and for rotating the reflected light beam approximately about said stationary primary image as a center, means comprising at least one optical lens in close proximity to aforesaid reflecting and rotating means for focusing the reflected light beam to form an image, at a definite distance from said reflecting and rotating means, of the aforesaid means for forming stationary primary image, thereby causing the reflected light beam to be of small cross section at a relatively great distance from said reflecting, rotating, and focusing means, and means comprising a multiplicity of optical lenses circularly disposed about aforesaid reflecting and rotating means for intercepting said reflected light beam at the point of aforesaid small cross section of beam at various angular positions of the beam and for re-focusing said reflected light beam to form a series of stationary secondary images displaced from each other in time and in position on a photosensitive film.

22. In a device for taking pictures, means comprising a pair of objective lenses for bringing light from the object to a focus to form a pair of stationary primary images arranged side-by-side, means for reflecting each of the beams of light which form said pair of stationary primary images along a multiplicity of rotating axes, one axis after another, such rotating axes generating different surfaces, each of such surfaces being a portion of the surface of an approximate cone, the location of the apex of each such approximate cone being approximately the same as the location of the aforesaid pair of stationary primary images, said reflecting and rotating means comprising a rotor having a multiplicity of reflecting faces disposed at various angular positions about the periphery of said rotor, each of such reflecting faces making a different angle with the axis of rotation of said rotor, such reflecting faces being arranged so that one complete image of the aforesaid pair of stationary primary images falls on one of the said reflecting faces at any time when the other image of the pair is falling on the intersection of two of said reflecting faces, means comprising at least one optical lens in close proximity to aforesaid reflecting and rotating means for focusing the reflected beams to form images, at a definite distance from said reflecting and rotating means, of the aforesaid means for forming a pair of stationary primary images, thereby causing the reflected light beams to be of small cross section at a relatively great distance from aforesaid reflecting and rotating means, and means comprising a multiplicity of optical lenses, disposed at various angular positions along the surface of each of the aforesaid approximate cones for intercepting each light beam of the reflected pair, at the point of aforesaid small cross section of beam, and for re-focusing each light beam to form a series of stationary secondary images displaced from each other in time and in position on stationary photosensitive film, such stationary secondary images formed by the light of one of the reflected beams being full images at all times when the stationary secondary images formed by the light of the other reflected beam are partial because of the aforementioned condition that at all times one or the other of the aforesaid pair of stationary primary images falls entirely on one of the reflecting faces of the aforesaid rotor.

23. In a device for taking pictures, means comprising a plurality of objective lenses for bringing light from the object to a focus to form a plurality of stationary primary images arranged adjacently, means comprising a rotating mirror for reflecting the beams of light which form said stationary primary images and for rotating the reflected light beams approximately about said stationary primary images as a center, means comprising at least one optical lens in close proximity to aforesaid reflecting and rotating means for focusing the reflected beams to form images, at a definite distance from said reflecting and rotating means, of the aforesaid means for forming the plurality of stationary primary images, thereby causing the reflected light beams to be of small cross section at a relatively great distance from aforesaid reflecting and rotating means, and means comprising a multiplicity of optical lenses circularly disposed about aforesaid reflecting and rotating means for intercepting said reflected light beams at the point of aforesaid small cross section of beam at various angular positions of the beams in such a manner that the interceptions of the reflected beam corresponding to any particular one of the aforesaid stationary primary images small intersperse the interceptions of the reflected beam corresponding to any other one of aforesaid stationary primary images and for re-focusing each of said reflected light beams to form a series of stationary secondary images displaced from each other in time and in position on photosensitive film.

24. In a device for taking pictures, means comprising a plurality of pairs of objective lenses for bringing light from the object to a focus to form two or more pairs of stationary primary images, the two images of each pair being arranged side-by-side and the different pairs of images being displaced from each other in a direction at right angles to the direction of displacement of the individual images of each pair, means for reflecting each of the beams of light which form said plurality of pairs of stationary primary images along a multiplicity of rotating axes, one axis after another, such rotating axes generating different surfaces, each such surface being a portion of the surface of an approximate cone, the location of the apex of each such approximate cone being approximately the same as the location of the aforesaid plurality of pairs of stationary primary images, said reflecting and rotating means comprising a rotor having a multiplicity of reflecting faces disposed at various angular positions about the periphery of said rotor, each such reflecting face making a different angle with the axis of rotation of said rotor, such reflecting faces being arranged so that one complete image of each of the aforesaid pairs of stationary primary images falls on one of the said reflecting faces at any time when the other image of that pair is falling on the intersection of two of said reflecting faces, means comprising at least one optical lens in close proximity to aforesaid reflecting and rotating means for focusing the reflected beams to form images, at a definite distance from said reflecting and rotating means, of the aforesaid means for forming the plurality of pairs of stationary primary images, thereby causing the reflected light beams to be of small cross section at a relatively great distance from aforesaid reflecting and rotating means, and means comprising a multiplicity of optical lenses disposed at various angular positions along the surface of each of the aforesaid approximate cones for intercepting each of the reflected light beams, at the point of aforesaid small cross section of beam, in such a manner that the interceptions of the reflected beams corresponding to any particular pair of aforesaid stationary primary images shall intersperse the interceptions of the reflected beams corresponding to any other pair of aforesaid stationary primary images and for re-focusing each reflected light beam to form a series of stationary secondary images displaced from each other in time and in position on photosensitive film, such stationary secondary images formed by the reflected light beam corresponding to one of each pair of stationary primary images being full images at all times when the stationary secondary images formed by the reflected light beam corresponding to the other one of that pair of stationary primary images are partial because of the aforementioned condition that at all times one image or the other of each of the aforesaid pairs of stationary primary images falls entirely on one of the reflecting faces of the aforesaid rotor.

25. In a shutter mechanism for a photographic camera, means for bringing light from the object to a focus to form a stationary primary image, means for reflecting the beam of light which forms said stationary primary image and for rotating the reflected beam approximately about said stationary primary image as a center in such a manner that the reflected beam shall traverse the objective lens of the photographic camera and that the aforesaid stationary primary image may serve as a stationary photographic object for the said camera during the time of traverse of said reflected beam across said objective lens.

26. In a shutter mechanism for a photographic camera, means for bringing light from the object to a focus to form a stationary primary image, and means for reflecting the beam of light which forms said stationary primary image, for rotating the reflected beam approximately about said stationary primary image as a center in such a manner that the reflected beam shall traverse the objective lens of the photographic camera and that the aforesaid stationary primary image may serve as a stationary photographic object for the said camera during the time of traverse of said reflected beam across said objective lens, and for focusing the said reflected beam in such a manner that it shall be of small cross section at the point along its length where it traverses aforesaid objective lens.

27. In a shutter mechanism for a photographic camera, means for bringing light from the object to a focus to form a stationary primary image, and means for reflecting the beam of light which forms said stationary primary image, for rotating the reflected beam approximately about said stationary primary image as a center in such a manner that the reflected beam shall traverse the objective lens of the photographic camera and that the aforesaid stationary primary image may serve as a stationary photographic object for the said camera during the time of traverse of said reflected beam across said objective lens, and for so focusing the said reflected beam as to form an image of the aforesaid means for forming stationary primary image at or near the point along the length of said reflected beam where the reflected beam traverses the said objective lens, thereby causing the reflected beam to be of small cross section at the said objective lens.

28. In a shutter mechanism for a photographic camera, means comprising an optical lens for bringing light from the object to a focus to form a stationary primary image, and means comprising a rotating mirror for reflecting the beam of light which forms said stationary primary image and for rotating the reflected beam approximately about said stationary primary image as a center in such a manner that the reflected beam shall traverse the objective lens of the photographic camera and that the aforesaid stationary primary image may serve as a stationary photographic object for the said camera during the time of traverse of said reflected beam across said objective lens.

29. In a shutter mechanism for a photographic camera, means comprising an optical lens for bringing light from the object to a focus to form a stationary primary image, and means comprising a rotating concave spherical reflecting surface for reflecting the beam of light which forms said stationary primary image, for rotating the reflected beam approximately about said stationary primary image as a center in such a manner that the reflected beam shall traverse the objective lens of the photographic camera and that the aforesaid stationary primary image may serve as a stationary photographic object for the said camera during the time of traverse of said reflected beam across said objective lens, and for so focusing the said reflected beam as to form an image of the aforesaid means for forming stationary primary image at or near the point along the length of said reflected beam where the reflected beam traverses the said objective lens, thereby causing the reflected beam to be of small cross section at the said objective lens.

30. In a shutter mechanism for a photographic camera, means comprising an optical lens for bringing light from the object to a focus to form a stationary primary image, means comprising a rotating mirror for reflecting the beam of light which forms said stationary primary image and for rotating the reflected beam approximately about said stationary primary image as a center in such a manner that the reflected beam shall traverse the objective lens of the photographic camera and that the aforesaid stationary primary image may serve as a stationary photographic object for the said camera during the time of traverse of said reflected beam across said objective lens, and means comprising at least one optical lens in close proximity to aforesaid reflecting and rotating means for so focusing the said reflected beam as to form an image of the aforesaid means for forming stationary primary image at or near the point along the length of said reflected beam where the reflected beam traverses the said objective lens, thereby causing the reflected beam to be of small cross section at the said objective lens.

CEARCY D. MILLER.